United States Patent [19]

Zucchini et al.

[11] 4,218,339

[45] Aug. 19, 1980

[54] CATALYST COMPONENTS AND CATALYSTS FOR POLYMERIZING OLEFINS PREPARED FROM THE CATALYSTS

[75] Inventors: Umberto Zucchini; Illaro Cuffiani, both of Ferrara, Italy

[73] Assignee: Montedison S.p.A., Milan, Italy

[21] Appl. No.: 908,670

[22] Filed: May 23, 1978

[30] Foreign Application Priority Data

May 24, 1977 [IT] Italy ............................ 23942 A/77

[51] Int. Cl.$^2$ ............................................. C08F 4/64
[52] U.S. Cl. ......................... 252/429 B; 252/431 R; 252/431 C; 526/124; 526/125; 526/127; 526/128
[58] Field of Search ............ 252/429 B, 431 R, 431 C

[56] References Cited

U.S. PATENT DOCUMENTS

| | | | |
|---|---|---|---|
| 3,094,568 | 6/1963 | Hay et al. ..................... | 252/429 B X |
| 4,071,672 | 1/1978 | Kashiwa ....................... | 252/429 B X |
| 4,085,276 | 4/1978 | Toyota et al. ................ | 252/429 B X |
| 4,105,847 | 8/1978 | Ito et al. ....................... | 252/429 B X |
| 4,115,319 | 9/1978 | Scata et al. .................. | 252/429 B |

*Primary Examiner*—Patrick Garvin

[57] ABSTRACT

There are disclosed catalyst components for polymerizing olefins, consisting of the product obtained by successively reacting (A) a Mg compound (halide, alcoholate, haloalcoholate, carboxylate, oxyde, hydroxyde, salt of an inorganic oxygen containing acid, Grignard reagent or reaction product of a Grignard reagent with a silicon compound), optionally in the form of a complex with an electron-donor compound, with (B) a compound having general formula $[MO_x(OR)_y]_n$, wherein M=Ti, V or Zr, R=an alkyl, an aryl or a cycloalkyl containing 1 to 20 carbon atoms, x may be zero, y is an integer not lower than 2, $2x+y=a$ valence of M, and n=an integer from 1 to 6 (inclusive), and with (C) a compound, other than the aluminium halides, exerting on component (B) a halogenating action and a reducing action, or a mixture of a halogenating compound with a reducing substance.

These components, used to prepare the final catalysts by mixing them with organometallic compounds of metals belonging to Groups I, II and III of the Mendelyeev Periodic Table, provide catalysts which are particularly active in the polymerization of ethylene, alpha-olefins having at least three carbon atoms, and mixtures of ethylene with alpha-olefins and/or with diolefins or multiolefins.

22 Claims, No Drawings

CATALYST COMPONENTS AND CATALYSTS FOR POLYMERIZING OLEFINS PREPARED FROM THE CATALYSTS

THE PRIOR ART

It is known that ethylene, the alpha-olefins, and mixtures thereof with each other and/or with diolefins can be polymerized with the aid of catalysts prepared from a transition metal halide, such as $TiCl_4$ or $TiCl_3$, and organometallic compounds of Groups I–III, such as organometallic compounds of Al. Many modifications of such catalysts have been proposed in the art. However, it is also known, that many of such catalyst systems have drawbacks and disadvantages when used in practice.

THE PRESENT INVENTION

One object of this invention is to provide new catalyst components which result in final catalysts that exhibit particularly high activity in the polymerization of olefins while being free of various disadvantages when used in actual practice for the production of the olefin polymers on a large commercial scale.

This and other objects are achieved by reacting the product of reaction between (A) a magnesium compound selected from the groups:

(1) compound having formula $$X_nMg(OR)_{2-n}$$

wherein X is a halogen atom, hydroxyl group or an alkyl, aryl or cycloalkyl radical containing 1–20 carbon atoms; R is an alkyl, aryl or cycloalkyl radical containing 1–20 carbon atoms, or a —COR' radical in which R' has the same meaning as R; $0 \leq n \leq 2$; or products of reaction of said compounds with electron-donor compounds;

(2) compounds having formula $$RMgX$$

wherein X is a halogen atom, and R is an alkyl, aryl or cycloalkyl radical containing 1–20 carbon atoms, or products of reaction of said compounds with silicon compounds containing the monomeric unit

in which R is the same or different from R', R being an alkyl, aryl, alkoxy or aryloxy radical, and R' being hydrogen, halogen or an alkyl, aryl or cycloalkyl radical containing 1–20 carbon atoms, the polymerization grade of said silicon compound ranging from 2 to 1000, or with silanols of formula $R_nSi(OH)_{4-n}$, wherein n is 1, 2 or 3 and R is hydrogen, alkyl, aryl or cycloalkyl having 1–20 carbon atoms or with condensation products of said silanols.

(3) Mg oxide, Mg hydroxide, Mg hydroxy halides, or Mg salts of inorganic oxygen containing acids; and (B) a compound of Ti, V or Zr containing at least two metaloxygen bonds Ti-OR, V-OR and Zr-OR, wherein R is an alkyl, aryl or cycloalkyl radical having 1–20 carbon atoms, with (C) a compound, other than the aluminum halides, capable of exerting a halogenating and a reducing action on compound (B), i.e. capable of substituting in compound (B) at least one group —OR with a halogen atom and of reducing the metal of compound (B) to a lower valence, or a mixture of a halogenating compound with a reducing substance; the reaction between compounds (A) and (B) being conducted in the presence of an electron-donor compound when compound (A) is an (A) (3) compound, and component (C) being a halogenating, but not necessarily a reducing compound when (A) is an (A) (2) compound.

Examples of (A) (1) compounds are the Mg dihalides, the Mg mono- and dialcoholates, examples of which are $Mg(OC_2H_5)_2$, $Mg(O-n-C_4H_9)_2$, $C_2H_5O MgCl$, $n-C_4H_9O MgCl$, the Mg carboxylates such as Mg acetate. As Mg dihalides the following compounds can be employed $MgCl_2$, which is the preferred one, $MgBr_2$, $MgI_2$, $MgCl_2 \cdot nROH$ (R=alkyl group, n=1–6), for example $MgCl_2 \cdot 3C_2H_5OH$, or $MgCl_2 \cdot n H_2O$ ($0 \leq n \leq 6$), and adducts of $MgCl_2$ with electron-donor compounds not containing active hydrogen atoms, like the esters of carboxylic acids, the ethers, ketones or amines.

Examples of (A) (2) compounds are $C_2H_5MgCl$, $n-C_4H_9MgCl$, $n-C_4H_9MgBr$ and products of a reaction of said Grignard reagents with diphenyl disiloxane, methlhydropolysiloxane, α.co-dimethyl dihydro polysiloxane or diphenyl silandiol.

Examples of (A) (3) compounds are MgO ClMgOH, Mg carbonate.

The electron-donor compounds used with the (A) (3) compounds are preferably selected amongst the esters of organic oxygen containing acids, particularly the esters of aromatic acids, the alcohols such as ethanol, n-butanol, 2-ethylhexanol, and the silanols. The electron-donor compound is present at least during the halogenation reaction conducted with component (C).

Component (B) can be represented by the formula $[MO_x(OR)_{y-n}]$, wherein M is Ti, V or Zr, R is an alkyl, alkenyl, aryl or cycloalkyl radical having 1–20 carbon atoms, x may also be zero, y being not lower than 2, 2x+y=valence of M, and n is an integer from 1 to 6 (inclusive).

Example of component (B) are: $Ti(OC_2H_5)_4$, $Ti(O-n-C_4H_9)_4$, $Ti(O-i-C_3H_7)_4$, $Ti(OC_6H_5)_4$, $V(O-i-C_3H_7)_4$, $VO(O-i-C_3H_7)_3$, Ti-triacetylacetonate, $Ti(OCH_3)_2(OC_2H_5)_2$.

However, haloalcoholates can be also used, as for instance $(n-C_4H_9O)_3 TiCl$.

Component (C) comprises a halogen-containing, preferably a chlorine-containing compound, capable of substituting a halogen atom for at least one group —OR in component (B). Specific examples of such compounds include organic acid halides RCOX (in which X is halogen, preferably chlorine, and R is an aliphatic or aromatic radical); hydrogen halides such as HCl, $SOCl_2$, $COCl_2$, $TiCl_4$, $BCl_3$, and others.

Particularly satisfactory results are achieved by using halogen-containing silicon compounds or halogen and hydrogen-containing silicon compounds. The latter act as both reducing agents and halogenating agents. Specific examples of such silicon compounds include:

silicon halides having formula $SiX_{4-n}Y_n$, in which X and Y represent halogen atoms, e.g., Cl and Br, and n is a number varying from zero to 3, inclusive, such as $SiCl_4$;

chlorosiloxanes of formula $Si_nO_{n-1}Cl_{2n+2}$, in which n is a number varying from 2 to 7 inclusive, e.g., $Si_2OCl_6$;

halogenated polysilanes having formula $Si_nX_{2n+2}$, wherein X is halogen and n is a number varying from 2 to 6, inclusive, for instance $Si_4Cl_{10}$;

halogensilanes having formula $SiH_{4-n}X_n$, in which X is halogen and n is a number varying from 1 to 3, inclusive, e.g., $SiHCl_3$;

alkyl-halogensilanes having formula $R_nSiH_xX_y$ wherein R is an aliphatic or aromatic radical, X is halogen, n is a number from 1 to 3, inclusive, x is a number varying from zero to 2, inclusive, and y is a number varying from 1 to 3, inclusive, e.g., $C_2H_5SiCl_3$; $CH_3SiCl_2H$; $(CH_3)_2SiCl_2$;

alkoxy-halogensilanes of formula $Si(OR)_{4-n}X_n$ in which X is halogen, R is alkyl or aryl having 1 to 20 carbon atoms and n is a number from 1 to 3, inclusive, e.g., $Si(OC_2H_5)Cl_3$.

If the product of the reaction between components (A) and (B) is reacted with a compound which is halogenating agent, and not a halogenating and reducing agent, such halogenating compound should be used with a compound which is a reducing agent for the (A) and (B) reaction product, i.e., capable of lowering the valence of the metal contained in component (B) to a value below that of its starting valence. Examples of such useful reducing agents include Na-alkyls, Li-alkyls, Zn-alkyls, Mg-alkyls and corresponding aryl-derivatives, Grignard compounds of the type RMgX (R is an aliphatic or aromatic hydrocarbon radical; X is halogen), the Na+alcohol system, and furthermore NaH and LiH. Particularly effective silicon compounds are the polyhydrosiloxanes in which the monomer unit has the general formula

wherein R is H, halogen, alkyl with 1 to 10 carbon atoms, aryl, alkoxyl, aryloxyl or carboxyl, and the polymerization grade ranges from 2 to 1,000, preferably from 3 to 100. Specific examples of such polyhydrosyloxanes include the compounds: $(CH_3)_3SiO[(CH_3)HSiO]_nSi(CH_3)_3$, $(CH_3HSiO)_4$, $(CH_3HSiO)_3$, $H_3Si-O-SiH_2-OSiH_3$, phenylhydropolysiloxanes in which the hydrogen atoms can be partially replaced by methyl groups.

Other silicon compounds useful are reducing agents in the practice of this invention are:

silanes $Si_nH_{2n+2}$, in which n is a number equal to or higher than 1, preferably equal to or higher than 3, e.g., $Si_3H_8$;

polysilanes that contain the group $(SiH)_x$ in which $x \geq 2$;

alkyl- or aryl-silanes $R_xSiH_{4-x}$, in which R is alkyl or aryl and x is a number varying from 1 to 3, inclusive, e.g., $(C_6H_5)_3SiH$;

alkoxy- or aryloxy-silanes $(RO)_xSiH_{4-x}$, in which R is alkyl or aryl and x is a number varying from 1 to 3, inclusive, e.g., $(C_2H_5O)_3SiH$.

The new catalyst-forming components of the invention can be obtained by reacting (A), (B) and (C) in an aliphatic or aromatic hydrocarbon diluent or in the absence of diluent. When at least one of the reagents is in the liquid state at the reaction temperature and pressure, the use of a solvent can be omitted.

(A) and (B) can be reacted preferably until a homogeneous product is obtained which is then reacted with component (C).

However, if (C) consists of a halogenating compound plus a reducing compound, the order of addition makes no difference: i.e., either the halogenating compound or the reducing compound can be reacted first. It is also possible to add both compounds simultaneously.

The reactions are conducted at a temperature ranging from $-10°$ C. to $+250°$ C., preferably from 20° C. to 200° C., the selection of the temperature depending also on the type of component (C), because the higher its reducing power, the lower the preferred reaction temperatures.

Since (C) is both a halogenating agent and a reducing agent, or it consists of a halogenating compound plus a reducing compound, the titanium, vanadium or zirconium in the final catalyst-forming component is almost entirely in the trivalent state, provided that a sufficient quantity of reducing agent is used.

Components (A) and (B) are reacted in such amounts as to have a transition metal/Mg atomic ratio comprised between 0.02 and 20, preferably between 0.1 and 3, while component (C) is employed in such amount as to have 0.5 to 100, preferably 1 to 30, gram-atoms of halogen per gram-atom of transition metal and 0.1 to 100, preferably 0.5 to 20, gram-equivalents of reducing agent per gram-atom of transition metal.

The catalytic components of the invention in combination with organometallic compounds of metals belonging to Groups I, II and III of the Mendelyeev Periodic Table, preferably an Al-alkyl, provide catalysts particularly effective in the polymerization of ethylene and of alpha-olefins.

The ethylene homopolymers prepared with the aid of these catalysts are characterized by a narrow molecular weight distribution, as resulting from the MI N/MI E ratio between melt index measured according to conditions N of standard ASTM D 1238 and the melt index measured according to conditions E of the same standard, such ratio being lower than 10 when the melt index is 5 g/10 min. as determined according to ASTM D-1238 (condition E).

This characteristic renders the ethylene homopolymers obtained with the catalysts of the present invention particularly suitable for molding.

The following examples are given to illustrate the invention in more detail, and are not intended to be limiting.

EXAMPLE 1

2.4 g of $MgCl_2$ (0.025 mole) and 17 g (0.05 mole) of $Ti(O-n-C_4H_9)_4$ were stirred in a flask in a nitrogen atmosphere at 160° C.; after 4 hours $MgCl_2$ was throughly dissolved. The resulting solution, cooled down to 60° C., was diluted with 80 cc of anhydrous n-heptane. Into this solution kept at 60° C. and under stirring, a solution of 5.8 cc (0.05 mole) of $SiCl_4$ in 20 cc of n-heptane was introduced in 1 hour. Once the addition was completed, the reaction mass was further heated for 1 h and 30 min. to 98° C. The resulting suspension was again brought to 60° C. and 19.4 cc (20.6 g) of polymethylhydrosiloxane (PMHS) of formula $(CH_3)_3SiO[(CH_3)HSiO]_nSi(CH_3)_3$, wherein n had a value of about 35, was dropped into it at 60° C. and over a time of 2 hours.

At the conclusion of the addition, stirring was continued for 1 hour at a temperature of 98° C. After cooling to room temperature, the resulting precipitate was repeatedly washed with anhydrous n-hexane and finally dried under vacuum at 70° C. to constant weight, thus obtaining 11.2 g of a red-orange power containing 16.95% of Ti.

For the polymerization test, a stainless steel 2.5-liter autoclave was fed, in the order stated and in a nitrogen atmosphere, with: 1,000 cc of anhydrous n-hexane, 1.5 g of Al(i-C$_4$H$_9$)$_3$ as co-catalyst and, finally, 0.014 g of the catalytic powder containing 2.5% of Ti. The autoclave was immediately heated to 85° C. and 5.2 hydrogen atmospheres as well as 7.8 ethylene atmospheres, were introduced, the ethylene feed being carried on continuously for 4 hours. The suspension was discharged from the autoclave, filtered, and the polyethylene was dried in an oven to constant weight. 170 g of polyethylene, corresponding to a yield of 71,700 g/g of Ti, were thus obtained.

The polymer had a melt index E (MI E) of 3.5 g/10 min., the MI N/MI E ratio being 8.6.

EXAMPLE 2

2.4 g (0.025 mole) of MgCl$_2$ were dissolved in 17 g (0.05 mole) of Ti(O-n-C$_4$H$_9$)$_4$, as in Example 1. The solution, after cooling to 45° C., was diluted with 50 cc of anhydrous n-hexane. Into this solution, kept at 45° C. and under stirring, a solution consisting of 30 cc of anhydrous n-hexane, 8 cc of PMHS (of the same type as employed in Example 3) and 17.4 cc (0.15 mole) of SiCl$_4$ was introduced in 3 hours.

At the conclusion of the addition, the suspension was stirred for a further 1 hour at 45° C. and then for 1 hour at the hexane reflux temperature. After cooling to room temperature, the resulting precipitate was isolated as described in Example 1. 4.4 g of a light brown powder, containing 4.75% of Ti, were obtained.

Ethylene was polymerized as disclosed in Example 1, except that the autoclave was fed with 0.0146 g of the catalytic powder containing 4.75% of Ti. 400 g of polyethylene, corresponding to a yield of 577,200 g/g of Ti, were obtained. The polymer had a melt index E of 4.85 g/10 min. and the MI N/MI E ratio was 8.2.

EXAMPLE 3

2.4 g of MgCl$_2$ (0.025 mole) were dissolved in 17 g (0.05 mole) of Ti(O-n-C$_4$H$_9$)$_4$ as described in Example 1. The solution, cooled to 45° C., was diluted with 50 cc of anhydrous n-hexane. Into this solution, kept at 45° C. and under stirring, a solution of 10.65 cc of PMHS (of the same type as used in Example 3) and 20 cc of anhydrous n-hexane was introduced in 1 hour. At the conclusion of the addition, the reaction mass was heated for 1 hour at the hexane reflux temperature. The temperature was then brought to 45° C., whereupon a solution of 25.5 g (0.15 mole) of SiCl$_4$ and of 20 cc of anhydrous n-hexane was introduced in 90 minutes into the suspension. At the conclusion of the addition, the reaction mixture was heated for 90 minutes at the hexane reflux temperature. After cooling to room temperature, the resulting precipitate was isolated as described in Example 1. 6.5 g of a brown powder containing 12.65% of Ti were obtained.

Ethylene was polymerized as in Example 1, with the exception that 0.0136 g of the catalytic powder containing 12.65% of Ti was charged to the autoclave.

328 g of polyethylene, corresponding to a yield of 190,700 g/g of Ti, were obtained. The polymer had a melt index E of 4.55 g/10 min., the MI N/MI E ratio was 8.5.

EXAMPLE 4

1.35 g of MgCl$_2$ (0.014 mole) were dissolved in 8.5 g of Ti(O-n-C$_4$H$_9$)$_4$ (0.025 mole) as described in Example 1. The resulting solution was cooled to room temperature, diluted with 50 cc of n-heptane and introduced, in 2 hours, into a flask containing 17 cc of a 2.97 molar solution of C$_2$H$_5$MgCl in diethyl ether, kept under stirring and at a temperature of 0° C.

Successively the resulting suspension was gradually heated to 60° C. and additioned in 1 hour, with 34 g (0.2 mole) of SiCl$_4$. Once all of the SiCl$_4$ was introduced, the reaction mixture was stirred for a further 90 minutes, and the temperature having been raised to 98° C. After cooling to room temperature, the resulting precipitate was isolated as described in Example 1. 9.0 g of a grey powder containing 5.3% of Ti were obtained.

Ethylene was polymerized as in Example 1, except that the autoclave was fed with 0.016 g of the catalytic powder containing 5.3% of Ti.

320 g of polyethylene, corresponding to a yield of 377,300 g/g of Ti, were obtained. The polymer had a melt index E of 9.7 g/10 min.; the MI N/MI E ratio was 8.6.

EXAMPLE 5

2.4 g of MgCl$_2$ (0.025 mole) were dissolved in 17 g of Ti(O-n-C$_4$H$_9$)$_4$ (0.05 mole), as described in Example 1. The solution was cooled to 40° C. and diluted with 80 cc of anhydrous n-heptane. Into this solution, kept under stirring at 40° C., 15.7 cc (0.15 mole) of dichloromethylsilane were introduced in 2 hours.

At the conclusion of said addition, the suspension was heated for a further two hours at a temperature of 98° C. After cooling to room temperature, the resulting precipitate was isolated as described in Example 1. 4.5 g of a light red powder containing 8.05% of Ti were thus obtained.

Ethylene was polymerized as described in Example 1, with the exception that the autoclave was fed with 0.0107 g of the catalytic powder containing 8.05% of Ti.

317 g of polyethylene, corresponding to a yield of 368,600 g/g of Ti, were obtained. The polymer had a melt index E of 3.2 g/10 min.; the MI N/MI E ratio was 8.2.

EXAMPLE 6

2.4 g (0.025 mole) of MgCl$_2$ were dissolved in 17 g (0.05 mole) of Ti (O-n-C$_4$H$_9$)$_4$, as in Example 1. The resulting solution was cooled to room temperature and diluted with 40 cc of anhydrous n-hexane. Into this solution, successively cooled to 15° C. and stirred, a solution of 40.9 g (0.3 mole) of SiHCl$_3$ in 10 cc of anhydrous n-hexane was introduced in 4 hours. At the conclusion of such addition, the temperature was raised to 60° C. and kept at that temperature for 1 hour. After cooling to room temperature, the resulting precipitate was isolated as described in Example 1. 3.6 g of a grey powder containing 6.4 of Ti were thus obtained.

Ethylene was polymerized as in Example 1, with the only exception that the autoclave was fed with 0.0088 g of the catalytic powder containing 6.4% of Ti. 330 g of polyethylene were obtained, corresponding to a yield of 586,100 g/g of Ti. The polymer had a melt index E of 2.3 g/10 min. The MI N/MI E ratio was 9.0.

EXAMPLE 7

The same procedure of example 2 was followed with the difference that 4.8 g (0.05 moles) of $MgCl_2$ were dissolved in a mixture of 17 g (0.05 moles) of Ti $(O-n-C_4H_9)_4$ and 4.5 cc (0.05 moles) of n-butanol.

After dissolution, 20 cc of anhydrous n-hexane were added and, successively, 12.7 cc (0.11 moles) of $SiCl_4$ and 24.3 cc of PMHS. Thus, 8.1 g of catalyst component containing 8.5% of Ti were obtained.

For the ethylene polymerization test it was operated as in example 1, except that 0.012 g of the catalyst component thus prepared were charged into the autoclave.

170 g of polyethylene, corresponding to a yield of 167,000 g/g Ti, were obtained. The polymer exhibited a melt index E of 4.3 g/10 min. and the MIN/MIE ratio was equal to 8.8.

EXAMPLE 8

The same procedure of example 2 was followed with the difference that 4.8 g (0.05 moles) of $MgCl_2$ were dissolved in 34 g (0.1 moles) of $Ti(O-n-C_4H_9)_4$. After dissolution, 50 cc of n-hexane were added and the resulting hexane solution was fed, at 45° C. and during 3 hours, into a solution consisting of 20 cc of n-hexane, 17.3 cc (0.15 moles) of $SiCl_4$ and 16.8 cc of PMHS. Thus, 11.1 g of catalyst component containing 11.0% Ti were obtained.

The ethylene polymerization test of example 1 was repeated, except that 0.016 g of the catalyst component thus prepared were employed.

320 g of polyethylene, corresponding to a yield of 178,000 g/g Ti, were obtained. The melt index E of the polymer was 5.4 g/10 min. and the MIN/MIE ratio was 8.0.

EXAMPLE 9

The same procedure of example 2 was followed with the difference that 2.4 g (0.025 moles) of $MgCl_2$ were dissolved in 31 g (0.05 moles) of Ti $(O-n-C_9H_{19})_4$. After dissolution, 50 cc of n-hexane were added and, successively, 8.6 cc (0.074 moles) of $SiCl_4$ and 6.8 cc of PMHS were also added and the whole was reacted at 45° C. for 3 hours. 4.1 g of a catalyst component containing 7.7% Ti were obtained.

The ethylene polymerization test was carried out as in example 1, with the difference that 0.016 g of the catalyst component thus prepared were charged into the autoclave.

130 g of polyethylene, corresponding to a yield of 102,000 g/g Ti, were obtained. The melt index E of the polymer was 2.7 g/10 min. and the MIN/MIE ratio was 9.1.

EXAMPLE 10

Example 5 was repeated employing the same amounts of $MgCl_2$, $Ti(O-n-C_4H_9)_4$ and n-heptane, but with the difference that 33 cc (0.3 moles) of $(CH_3)_2$ Cl Si H, in the place of $Cl_2CH_3Si$ H, were employed. Thus, 7.8 g of a catalyst component containing 14.1% Ti were obtained.

The ethylene polymerization test was carried out as in example 1, employing 0.0176 g of the catalyst component thus prepared.

265 g of polyethylene, corresponding to a yield of of 106,000 g/g Ti, were obtained. The polymer exhibited a melt index E of 5.9 g/10 min. and the MIN/MIE ratio was 7.9.

EXAMPLE 11

Example 8 was repeated with the difference that the solution of $SiCl_4$ and PMHS was added to the other reagents all at once instead of during 3 hours. Thus, 9.3 g of a catalyst component containing 5.0% Ti were obtained.

For the ethylene polymerization test it was operated as in example 1, with the difference that 0.015 g of the catalyst component thus prepared were employed.

360 g of polyethylene, corresponding to a yield of 480,000 g/g Ti, were obtained. The melt index E of the polymer was 5.3 g/10 min. and the MIN/MIE ratio was 7.9.

EXAMPLE 12

Example 2 was repeated employing 13.9 g (0.04 moles) of Ti $(O-n-C_4H_9)_4$, 1.8 g (0.019 moles) of $MgCl_2$ and 7.1 cc (0.06 moles) of $SiCl_4$; 7.5 g (0.04 moles) of Si $(OC_2H_5)_3H$ were used in the place of PMHS. Thus, 3.2 g of a catalyst component containing 13.65% Ti were obtained.

Ethylene was polymerized as in example 1 by the aid of 0.020 g of the above catalyst component: 195 g of polyethylene, corresponding to a yield of 70,500 g/g Ti, were obtained. The polymer exhibited a melt index E of 3.0 g/10 min. and the MIN/MIE ratio was 8.4.

EXAMPLE 13

Example 2 was repeated employing 17 g (0.05 moles) of $Ti(O-n-C_4H_9)_4$, 2.2 g (0.023 moles) of $MgCl_2$, 9.1 cc of PMHS and 10 cc (0.1 moles) of $SiHCl_3$ in the place of $SiCl_4$. Thus, 9.1 g of a catalyst component containing 13.0% Ti were obtained.

By polymerizing ethylene as described in example 1 in the presence of 0.015 g of the catalyst component thus prepared, 129 g of polyethylene corresponding to a yield of 65,000 g/g Ti were obtained: the polymer exhibited a melt index E of 4.2 g/10 min. and the MIN/MIE ratio was 8.0.

EXAMPLE 14

Example 2 was repeated employing 34 g (0.1 moles) of $Ti(O-n-C_4H_9)_4$, 4.8 g (0.05 moles) of $MgCl_2$, 17.3 cc (0.15 moles) of $SiCl_4$ and, in the place of PMHS, 28.0 g of a partially methylated polymethylhydrosiloxane containing 0.9 by weight of hydrogen (TEGILOXAN PTF 16 produced by Goldschmidt). Thus, 12.2 g of a catalyst component containing 9.1% Ti were obtained.

The ethylene polymerization test was carried out as in example 1 by the aid of 0.016 g of the above catalyst component and 125 g of polyethylene, corresponding to a yield of 85,500 g/g Ti, were obtained; the polymer exhibited a melt index E of 1.1 g/10 min. and the MIN/MIE ratio was 7.75.

EXAMPLE 15

Example 2 was repeated with the difference that 15.9 g (0.052 moles) of Ti $(O-n-C_4H_9)_3$ Cl were employed in the place of $Ti(O-n-C_4H_9)_4$ and that 5.8 g (0.0176 moles) of $MgCl_2.5C_2H_5OH$ were employed in the place of $MgCl_2$. Following the same procedure of example 2, 17.3 cc (0.15 moles) of $SiCl_4$ and 20.2 cc of PMHS were employed. Thus, 2.9 g of a catalyst component containing 9.4% Ti were obtained.

The ethylene polymerization test was carried out as in example 1 by the aid of 0.016 g of the above catalyst component and 296 g of polyethylene, corresponding to a yield of 197,000 g/g Ti, were obtained; the melt index E of the polymer was 6.8 g/10 min. and the MIN/MIE ratio was 9.5.

EXAMPLE 16

Into a flask of 250 cc capacity were introduced 0.925 g (0.038 moles) of chips of Mg metal, 6.7 cc of absolute $C_2H_5OH$ and 25 g (0.0725 moles) of $Ti(O-n-C_4H_9)$, the temperature was gradually raised up to 130° C. and maintained at this value for 2 hours; then the unreacted ethanol was removed by distillation. After cooling to 50° C., 50 cc of n-hexane were added to the obtained solution; then 43 cc (0.375 moles) of $SiCl_4$ and 27 cc of PMHS were fed, during 4 hous, into this diluted solution maintained at 50° C. After the above addition, the whole was heated at the refluxing temperature of hexane for 1 hour and, after cooling to room temperature, the catalytic solid so obtained was washed with hexane until disappearance of the Cl'ions. After drying, 9.4 g of a catalyst component containing 6.3% Ti were obtained.

The ethylene polymerization test was carried out as described in example 1, in the presence of 0.0144 g of the above catalyst component, and 411 g of polyethylene, corresponding to a yield of 466,000 g/g Ti, were obtained. The polymer exhibited a melt index E of 3.5 g/10 min. and the MIN/MIE ratio was 8.7.

EXAMPLE 17

2.4 g (0.0167 moles) of anhydrous Mg acetate were reacted with 17 g (0.05 moles) of Ti $(O-n-C_4H_9)_4$ at 135° C. for 3 hours. Only a partial dissolution occurred; the reaction mixture was diluted with 35 cc of n-hexane and 31 cc (0.31 moles) of $SiHCl_3$ were dropped into it at 50° C. during 3 hours.

The solid thus obtained was washed and dried, as illustrated in the preceding examples, and 1.8 g of a catalyst component containing 3.3% Ti were obtained.

Ethylene was polymerized as described in example 1, with the difference that 0.0123 g of the above catalyst component were employed, and 160 g of polyethylene corresponding to a yield of 395,000 g/g Ti were obtained. The polymer exhibited a melt index E of 3.2 g/10 min. and the MIN/MIE ratio was 8.4.

EXAMPLE 18

The same procedure of example 6 was followed, with the difference that 2.0 g (0.016 moles) of $MgCl_2.1.2\ H_2O$ and 17 g (0.05 moles) of Ti $(O-n-C_4H_9)_4$ were employed. The subsequent reaction with Si $HCl_3$ was carried out at 50° C. employing 31 cc (0.31 moles) of Si H $Cl_3$: 2.8 g of a catalyst component containing 10.9% Ti were obtained.

The ethylene polymerization test of example 1 was repeated employing 0.0123 g of the above catalyst component: g 376 of polyethylene, corresponding to a yield of 281,000 g/g Ti, were obtained.

The polymer had a melt index E of 3.8 g/10 min. and the MIN/MIE ratio was 9.0.

EXAMPLE 19

17 g (0.05 moles) of Ti $(O-n-C_4H_9)_4$ were introduced into a flask of 250 cc capacity and diluted with 17 cc of diethyl ether; 17 cc of an ether solution of 0.05 moles of Cl Mg $C_2H_5$ were dropped, during 1 hour, into this solution maintained at 0° C. After this addition, the temperature was gradually raised up to 50° C., while at the same time the diethyl ether was removed by distillation. The solid residue was suspended in 100 cc of n-hexane and added, at 50° C. and during 1 hour, with 26 cc (0.226 moles) of $SiCl_4$; then the reaction mixture was heated at the refluxing temperature of n-hexane for one further hour. The solid product thus obtained was washed with n-hexane and dried as described in the preceding examples: 10.7 g of a red-brown powder containing 6.95% Ti were obtained.

Ethylene was polymerized as in example 1, with the difference that 0.0122 of the catalytic powder thus obtained were employed: 318 g of polyethylene were obtained, corresponding to a yield of 375,000 g/g Ti. The polymer exhibited a melt index E of 6.6 g/10 min. and the MIN/MIE ratio was 8.8.

EXAMPLE 20

35 g (0.1 moles) of Ti $(O-n-C_4H_9)_4$ were diluted with 35 cc of toluene in a flask of 500 cc capacity and to this solution were added, at room temperature and during 1 hour, 66 cc a toluene solution containing dissolved a product prepared by reacting, at 70° C. in tetrahydrofurane as reaction medium, 0.75 moles of $C_4H_9MgCl$ and 0.75 moles (calculated on the silicon) of PMHS, removing the tetrahydrofurane by evaporation and replacing it with toluene.

After the addition of the above toluene solution, the obtained red-brown solution was heated at 70° C. for 2 hours; after cooling to room temperature, 36.3 cc (0.31 moles) of $SiCl_4$ were added during 30 minutes.

The obtained suspension was then heated for 1 hour at the refluxing temperature of $SiCl_4$. The so prepared solid was washed with n-hexane and dried as already described for the catalyst components of the preceding examples: 13.5 g of a catalyst component containing 4.1% Ti were obtained.

The ethylene polymerization test of example 1 was repeated with the difference that 0.005 g of the above catalyst component were employed: 270 g of polyethylene were obtained, corresponding to a yield of 1,310,000 g/g Ti. The melt index E of the polymer was 7.5 g/10 min., and the MIN/MIE ratio was 9.1.

EXAMPLE 21

4 g (0.1 moles) of MgO, 34 g (0.1 moles) of $Ti(O-n-C_4H_9)_4$ and 15 g (0.1 moles) of ethyl benzoate were reacted under stirring at 140° C. for 2 hours.

After cooling of the reaction mixture to 50° C., 70 cc of n-heptane were added and succesively 40 cc of PMHS and 51.7 cc (0.45 moles) of $SiCl_4$ were also added during 2 hours and still at 50° C. After the above additions, the reaction mixture was heated again at the refluxing temperature of $SiCl_4$ for 1 hour.

At the end the obtained solid was washed with n-hexane and dried as described in the preceding examples: 7.7 g of a catalyst component containing 3.6% Ti were obtained.

The ethylene polymerization test was carried out according to the procedure of example 1, with the exception that 0.016 g of the above catalyst component were employed: 95 g of polyethylene were obtained, corresponding to a yield of 165,000 g/g Ti. The melt index E was 2 g/10 min and the MIN/MIE ratio 9.1.

EXAMPLE 22

70 cc of a suspension of 0.125 moles of n-C$_4$H$_9$MgCl in a mixture tetrahydrofurane/toluene (molar ratio 1/4) were dropped, during 30 minutes and at room temperature, into a suspension of 13 g (0.06 moles) of diphenyl silandiol in 25 cc of toluene.

40 cc of the so obtained suspension were mixed with 80 cc of toluene and 43 cc (0.126 moles) of Ti(O-n-C$_4$H$_9$)$_4$. The mixture was heated at 50° C., and 25 cc of PMHS and 36 cc (0.3 moles) of SiCl$_4$ were fed simultaneously during 2 hours into this heated suspension; at the end, the suspension was heated again at 70° C. for 1 hour. The so obtained solid was then washed with n-hexane and dried as described in the preceding examples: 17.1 g of a catalyst component containing 10.8% Ti were obtained.

The ethylene polymerization test was carried out according to the procedure of example 1, with the difference that 0.008 g of the above catalyst component were employed: 144 g of polyethylene were obtained, corresponding to a yield of 167,000 g/g Ti.

The polymer exhibited a melt index E of 4.9 g/10 min. and the MIN/MIE ratio was 9.2.

What we claim is:

1. Components for catalysts for the polymerization of olefins, consisting of the product obtained by reacting the product of reaction between
(A) a magnesium compound selected from the groups
   (1) compounds having formula $$X_nMg(OR)_{2-n}$$

wherein X is a halogen atom, a hydroxyl group or an alkyl, aryl or cycloalkyl radical containing 1–20 carbon atoms; R is an alkyl, aryl or cycloalkyl radical containing 1–20 carbon atoms, or a —COR' radical in which R' has the same meaning as R; $0 \leq n \leq 2$; or products of reaction of said compounds with hydrocarbyl electron-donor compounds;
   (2) compounds having formula $$RMgX$$

wherein X is a halogen atom, and R is an alkyl, aryl or cycloalkyl radical containing 1–20 carbon atoms, or products of reaction of said compounds with polysiloxane compounds containing from 2 to 1000 monomeric units $$\begin{array}{c} R \\ | \\ -SiO- \\ | \\ R' \end{array}$$

in which R is the same or different from R', R being an alkyl, aryl, alkoxy or aryloxy radical, and R' being hydrogen, halogen or an alkyl, aryl or cycloalkyl radical containing 1–20 carbon atoms;
   (3) Mg oxide, Mg hydroxide, Mg hydroxy halides, or Mg salts of inorganic oxygen containing acids, and
(B) a compound of Ti, V or Zr containing at least two —OR groups linked to a Ti, V or Zr atom through the oxygen atom, and in which R is an alkyl, aryl or cycloalkyl radical having 1–20 carbon atoms, with
(C) a silicon compound capable of substituting, in compound (B), at least one —OR group with a halogen atom and to reduce the valence of the metal of compound (B) to a lower valence, or a mixture of a compound capable of substituting, in compound (B), at least one —OR group with a halogen atom and a compound capable of reducing the metal of compound (B) to a lower valence; with reaction between compounds (A) and (B) being conducted in the presence of a hydrocarbyl electron-donor compound when compound (A) is an (A)(3) compound, and component (C) being a halogenating, but not necessarily a reducing compound when (A) is an (A)(2) compound.

2. Catalyst components according to claim 1, characterized in that anhydrous MgCl$_2$ is employed as component (A).

3. Catalyst components according to claim 1, characterized in that MgCl$_2$.5C$_2$H$_5$OH is employed as component (A).

4. Catalyst components according to claim 1, characterized in that Mg(OC$_2$H$_5$) is employed as component (A).

5. Catalyst components according to claim 1, characterized in that (CH$_3$COO)$_2$Mg is employed as component (A).

6. Catalyst components according to claim 1, characterized in that MgCl$_2$.nH$_2$O, in which $0 \leq n \leq 6$, is employed as component (A).

7. Catalyst components according to claim 1, characterized in that C$_2$H$_5$MgCl is employed as component (A).

8. Catalyst components according to claim 1, characterized in that a reaction product C$_4$H$_9$MgCl/polymethylhydrosiloxane is employed as component (A).

9. Catalyst components according to claim 1, characterized in that MgO is employed as component (A).

10. Catalyst components according to claim 1, characterized in that a reaction product C$_4$H$_9$MgCl/diphenyl silandiol is employed as component (A).

11. Catalyst components according to claim 1, characterized in that Ti(O-n-C$_4$H$_9$)$_4$ is employed as component (B).

12. Catalyst components according to claim 1, characterized in that Ti(O-n-C$_2$H$_9$)$_3$Cl is employed as component (B).

13. Catalyst components according to claim 1, characterized in that a combination of SiCl$_4$ and of a polymethylhydrosiloxane is employed as component (C).

14. Catalyst components according to claim 1, characterized in that a combination of SiCl$_4$ and of C$_2$H$_5$MgCl is employed as component (C).

15. Catalyst components according to claim 1, characterized in that CH$_3$SiCl$_2$H is employed as component (C).

16. Catalyst components according to claim 1, characterized in that SiHCl$_3$ is employed as components (C).

17. Catalyst components according to claim 1, characterized in that (CH$_3$)$_2$SiClH is employed as component (C).

18. Catalyst components according to claim 1, characterized in that a combination of SiCl$_4$ and of Si(OC$_2$H$_5$)$_3$H is employed as component (C).

19. Catalyst components according to claim 1, characterized in that a combination of SiCl$_3$H and of a polymethylhydrosiloxane is employed as component (C).

20. Process for preparing the catalyst components according to claim 1, characterized in that component (A) is reacted with component (B), and that the resulting product is reacted with component (C), such reactions being effected at a temperature ranging from −10° C. to +250° C., either or not in the presence of a hydrocarbon diluent.

21. Catalysts for the polymerization of olefins, consisting of a catalyst component according to claim 1 and of an alkyl aluminum compound.

22. Catalyst according to claim 21, in which the alkyl aluminum compound is an Al-trialkyl.

* * * * *